US012367697B2

(12) United States Patent
Sumeet et al.

(10) Patent No.: US 12,367,697 B2
(45) Date of Patent: Jul. 22, 2025

(54) METHOD AND SYSTEM FOR GENERATING A DATA MODEL FOR TEXT EXTRACTION FROM DOCUMENTS

(71) Applicant: Tata Consultancy Services Limited, Mumbai (IN)

(72) Inventors: Nupur Sumeet, Thane West (IN); Manoj Karunakaran Nambiar, Thane West (IN); Karan Rawat, New Delhi (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 378 days.

(21) Appl. No.: 18/129,155

(22) Filed: Mar. 31, 2023

(65) Prior Publication Data

US 2024/0005686 A1 Jan. 4, 2024

(30) Foreign Application Priority Data

May 18, 2022 (IN) .............................. 202221028692

(51) Int. Cl.
*G06V 30/19* (2022.01)
*G06N 3/082* (2023.01)
*G06V 10/82* (2022.01)
*G06V 10/94* (2022.01)

(52) U.S. Cl.
CPC ......... *G06V 30/1916* (2022.01); *G06N 3/082* (2013.01); *G06V 10/82* (2022.01); *G06V 10/94* (2022.01); *G06V 30/19147* (2022.01)

(58) Field of Classification Search
CPC .... G06V 30/1916; G06V 10/82; G06V 10/94; G06V 30/19147; G06N 3/082; G06N 3/045; G06N 3/096
See application file for complete search history.

(56) References Cited

U.S. PATENT DOCUMENTS 11,200,497 B1 * 12/2021 Yan ........................ G06N 3/045

OTHER PUBLICATIONS

Iterative Structured Pruning, Zhao et al, Jan. 2022 (Year: 2022).*

(Continued)

*Primary Examiner* — Jianxun Yang
(74) *Attorney, Agent, or Firm* — FINNEGAN, HENDERSON, FARABOW, GARRETT & DUNNER LLP

(57) ABSTRACT

State of the art techniques used for document processing and particularly for handling processing of images for data extraction have the disadvantage that they have large computational load and memory footprint. The disclosure herein generally relates to text processing, and, more particularly, to a method and system for generating a data model for text extraction from documents. The system prunes a pretrained base model using a Lottery Ticket Hypothesis (LTH) algorithm, to generate a LTH pruned data model. The system further trims the LTH pruned data model to obtain a structured pruned data model, which involves discarding filters that have filter sparsity exceeding a threshold of filter sparsity. The structured pruned data model is then trained from a teacher model in a Knowledge Distillation algorithm, wherein a resultant data model obtained after training the structured pruned data model forms the data model for text detection.

9 Claims, 9 Drawing Sheets

(56) References Cited

OTHER PUBLICATIONS

Chen et al., "Coarsening the Granularity: Towards Structurally Sparse Lottery Tickets," (2022).
Ghimire et al., "A Survey on Efficient Convolutional Neural Networks and Hardware Acceleration," Electronics, 11(945) (2022).
Pan et al., "Fine-tuning Pruned Networks with Linear Over-parameterization," (2022).
Xia et al., "Structured Pruning Learns Compact and Accurate Models," (2022).

* cited by examiner

METHOD AND SYSTEM FOR GENERATING A DATA MODEL FOR TEXT EXTRACTION FROM DOCUMENTS

PRIORITY CLAIM

This U.S. patent application claims priority under 35 U.S.C. § 119 to: Indian Patent Application No. 202221028692, filed on May 18, 2022. The entire contents of the aforementioned application are incorporated herein by reference.

TECHNICAL FIELD

The disclosure herein generally relates to the field of text processing, and, more particularly, to a method and system for generating a data model for text extraction from documents.

BACKGROUND

Documents contain many images which in turn may contain a lot of information such as but not limited to texts, pictures and graphics. The texts in the images of physical documents is considered as the main data source for analysis task. Text regions can be used to label and train automatic layout learning systems or to detect and locate relevant fields in the document including title, keywords, subheadings, paragraphs and other structured regions (image/table). Segmenting text regions in the image, therefore, is a fundamental step before tasks like text recognition are performed.

State of the art techniques used for document processing and particularly for handling processing of images for data extraction have the disadvantage that they are performance sensitive and computationally complex. They have large computational load and memory footprint, which causes data processing to take long time for inference and in turn makes them not suitable for real-time requirements.

SUMMARY

Embodiments of the present disclosure present technological improvements as solutions to one or more of the above-mentioned technical problems recognized by the inventors in conventional systems. For example, in one embodiment, a processor implemented method of obtaining a data model for text detection is provided. The method includes obtaining a) a training dataset, b) a test dataset, c) a pre-trained base model, d) a plurality of pre-trained weights, and e) an acceptable drop in accuracy with respect to the baseline model, as input. Further, the pre-trained base model is pruned using a Lottery Ticket Hypothesis (LTH) algorithm to generate a LTH pruned data model. Further, the LTH pruned data model is trimmed to obtain a structured pruned data model. Trimming the LTH pruned data model to obtain a structured pruned data model includes iteratively performing the following steps till an accuracy drop of the structured pruned data model is below the acceptable drop in accuracy. In this process, initially a filter sparsity of every filter of each of a plurality of layers of the structured pruned data model obtained after a preliminary pruning of the LTH pruned data model is determined. The determined filter sparsity is compared with a threshold of filter sparsity. Further, all filters for which the determined filter sparsity exceeds the threshold of filter sparsity are discarded, wherein discarding the filters causes structured pruning. Further, the plurality of pre-trained weights are fine-tuned by training the structured pruned data model for a pre-defined number of iterations. Further, the accuracy drop of the structured pruned data model is determined based on the fine-tuned plurality of pre-trained weights. After every iteration if the accuracy drop is still exceeding the acceptable drop in accuracy, a pruning rate affecting rate of pruning of the LTH pruned data model is increased by a pre-defined percentage and for a resulting pruned data model the aforementioned steps are performed. The structured pruned data model is then trained from a teacher model in a Knowledge Distillation algorithm, wherein a resultant data model obtained after training the structured pruned data model forms the data model for text detection.

In another embodiment, discarding the filters includes initially determining number of zeros in every layer of the structured pruned data model. Further, zero percentage in every layer of the structured pruned data model is determined. Further, number of zeros in all layers having the determined zero percentage exceeding a threshold of zero percentage is determined. Further, zero percentage of all filters in all the layers for which the determined number of zeros exceeds a threshold of zeros is determined. Further, all filters for which the determined zero percentage exceeds the threshold of zero percentage are discarded, wherein the filters are discarded by setting corresponding non-zero weights to zero.

In yet another embodiment, a system for obtaining a data model for text detection is provided. The system includes one or more hardware processors, a communication interface, and a memory (104) storing a plurality of instructions. The plurality of instructions when executed, cause the one or more hardware processors to initially obtain a) a training dataset, b) a test dataset, c) a pre-trained base model, d) a plurality of pre-trained weights, and e) an acceptable drop in accuracy with respect to the baseline model, as input. The system then prunes the pre-trained base model using a Lottery Ticket Hypothesis (LTH) algorithm to generate a LTH pruned data model. The system further trims the LTH pruned data model to obtain a structured pruned data model, by iteratively performing the following steps till an accuracy drop of the structured pruned data model is below the acceptable drop in accuracy. In this process, initially a filter sparsity of every filter of each of a plurality of layers of the structured pruned data model obtained after a preliminary pruning of the LTH pruned data model is determined. The determined filter sparsity is compared with a threshold of filter sparsity. Further, all filters for which the determined filter sparsity exceeds the threshold of filter sparsity are discarded, wherein discarding the filters causes structured pruning. Further, the plurality of pre-trained weights are fine-tuned by training the structured pruned data model for a pre-defined number of iterations. Further, the accuracy drop of the structured pruned data model is determined based on the fine-tuned plurality of pre-trained weights. After every iteration if the accuracy drop is still exceeding the acceptable drop in accuracy, a pruning rate affecting rate of pruning of the LTH pruned data model is increased by a pre-defined percentage and for a resulting pruned data model the aforementioned steps are performed. The structured pruned data model is then trained from a teacher model in a Knowledge Distillation algorithm, wherein a resultant data model obtained after training the structured pruned data model forms the data model for text detection.

In yet another embodiment, the system discards the filters by initially determining number of zeros in every layer of the structured pruned data model. Further, zero percentage in every layer of the structured pruned data model is determined. Further, number of zeros in all layers having the determined zero percentage exceeding a threshold of zero percentage is determined. Further, zero percentage of all filters in all the layers for which the determined number of zeros exceeds a threshold of zeros is determined. Further, all filters for which the determined zero percentage exceeds the threshold of zero percentage are discarded, wherein the filters are discarded by setting corresponding non-zero weights to zero.

In yet another embodiment, a non-transitory computer readable medium for obtaining a data model for text detection is provided. The non-transitory computer readable medium includes a plurality of instructions which when executed, cause one or more hardware processors to perform the following steps to obtain the data model. In this method, a) a training dataset, b) a test dataset, c) a pre-trained base model, d) a plurality of pre-trained weights, and e) an acceptable drop in accuracy with respect to the baseline model, are obtained as input. Further, the pre-trained base model is pruned using a Lottery Ticket Hypothesis (LTH) algorithm to generate a LTH pruned data model. Further, the LTH pruned data model is trimmed to obtain a structured pruned data model. Trimming the LTH pruned data model to obtain a structured pruned data model includes iteratively performing the following steps till an accuracy drop of the structured pruned data model is below the acceptable drop in accuracy. In this process, initially a filter sparsity of every filter of each of a plurality of layers of the structured pruned data model obtained after a preliminary pruning of the LTH pruned data model is determined. The determined filter sparsity is compared with a threshold of filter sparsity. Further, all filters for which the determined filter sparsity exceeds the threshold of filter sparsity are discarded, wherein discarding the filters causes structured pruning. Further, the plurality of pre-trained weights are fine-tuned by training the structured pruned data model for a pre-defined number of iterations. Further, the accuracy drop of the structured pruned data model is determined based on the fine-tuned plurality of pre-trained weights. After every iteration if the accuracy drop is still exceeding the acceptable drop in accuracy, a pruning rate affecting rate of pruning of the LTH pruned data model is increased by a pre-defined percentage and for a resulting pruned data model the aforementioned steps are performed. The structured pruned data model is then trained from a teacher model in a Knowledge Distillation algorithm, wherein a resultant data model obtained after training the structured pruned data model forms the data model for text detection.

In another embodiment, the non-transitory computer readable medium causes discarding of the filters by initially determining number of zeros in every layer of the structured pruned data model. Further, zero percentage in every layer of the structured pruned data model is determined. Further, number of zeros in all layers having the determined zero percentage exceeding a threshold of zero percentage is determined. Further, zero percentage of all filters in all the layers for which the determined number of zeros exceeds a threshold of zeros is determined. Further, all filters for which the determined zero percentage exceeds the threshold of zero percentage are discarded, wherein the filters are discarded by setting corresponding non-zero weights to zero.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
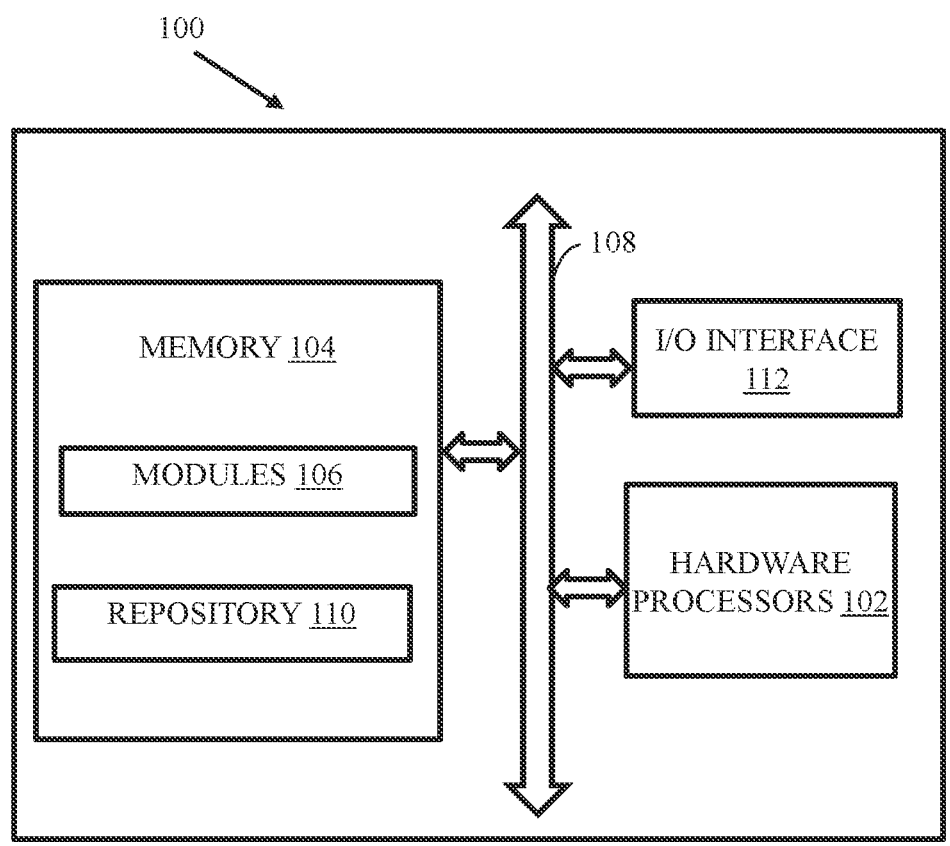
FIG. 1 is a block diagram of a system for generating a data model for text processing, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Referring now to the drawings, and more particularly to FIG. 1 through FIG. 7C, where similar reference characters denote corresponding features consistently throughout the figures, there are shown preferred embodiments and these embodiments are described in the context of the following exemplary system and/or method.

FIG. 1 is a block diagram of a system 100 for generating a data model for text processing, according to some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the 110 interface 112 may enable the system 100 to communicate with other devices, such as web servers, and external databases.

The 110 interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 106.

The plurality of modules 106 include programs or coded instructions that supplement applications or functions performed by the system 100 for executing different steps involved in the process of generating the data model for text extraction from documents, being performed by the system 100. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for generating the data model for text extraction from documents.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to steps in flow diagrams in FIG. 2 and FIG. 3.

Figure 2:
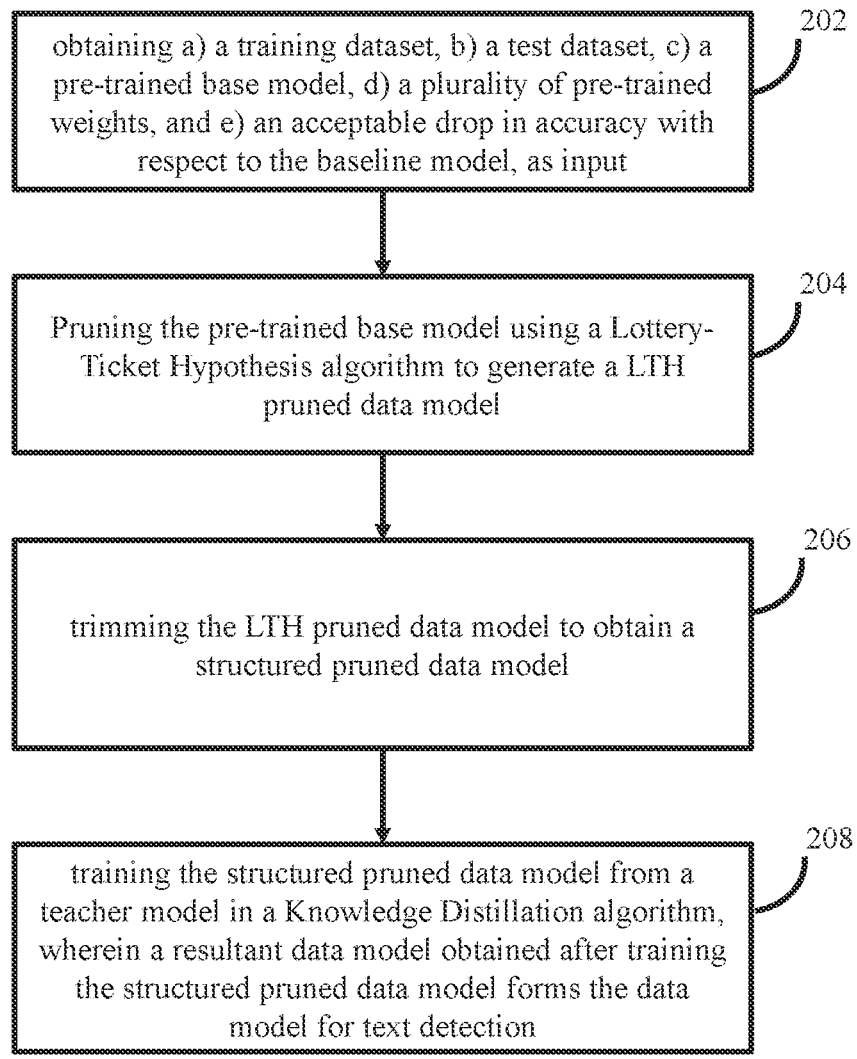
FIG. 2 is a flow diagram depicting steps involved in the process of generating a data model for text processing, using the system of FIG. 1, according to some embodiments of the present disclosure.

FIG. 2 is a flow diagram depicting steps of a method 200 involved in the process of generating a data model for text processing, using the system of FIG. 1, according to some embodiments of the present disclosure.

At step 202 of the method 200 in the system 100 obtains a) a training dataset, b) a test dataset, c) a pre-trained base model, d) a plurality of pre-trained weights, and e) an acceptable drop in accuracy with respect to the baseline model, as input. The training dataset contains one or more documents which may contain one or more images which may contain information/data. The test dataset may contain similar documents and data as in the training data, that may be fed as input to data models for determining efficiency and for various other purposes. For training the pre-trained data model, a variety of documents containing images maybe used. The pre-trained weights maybe used during training of the pre-trained data model, and may be decided based on any standard neural network training approach. The acceptable drop in accuracy with respect to the baseline model indicates extent of accuracy drop permitted or may be tolerated.

Further, at step 204 of the method 200, the pre-trained base model is pruned using a Lottery Ticket Hypothesis (LTH) algorithm, to obtain/generate a LTH pruned data model. Further, at step 206 of the method 200, the system 100 trims the LTH pruned data model to obtain a structured pruned data model. By doing so, a smaller version of the LTH pruned data model is obtained. Various steps involved in the process of trimming the LTH pruned data model by the system 100 are depicted in method 300 in FIG. 3, and are explained hereafter.

The steps in the method 300 are iteratively performed till an accuracy drop of the structured pruned data model is below the acceptable drop in accuracy. In this process, at step 302 of the method 300, a filter sparsity of every filter of each of a plurality of layers of the LTH pruned data model is determined. The filter sparsity refers to extent/amount of values that are not significant, and are represented as zero. For example, in FIG. 6A, where there is no sparsity, all cells have been filled, whereas in FIG. 6B which depicts structural sparsity, empty cells maybe observed. Number of such cells are determined/calculated at step 302. Further, at step 304 of the method 300, the determined filter sparsity is compared with a threshold of filter sparsity, and at step 306 of the method 300, all filters for which the determined filter sparsity exceeds the threshold of filter sparsity are discarded. Discarding the filters causes structured pruning and a resulting data model after discarding the filters form the structured pruned data model. Various steps involved in the process of discarding the filters are depicted in FIG. 4 and are explained hereafter.

Figure 4:
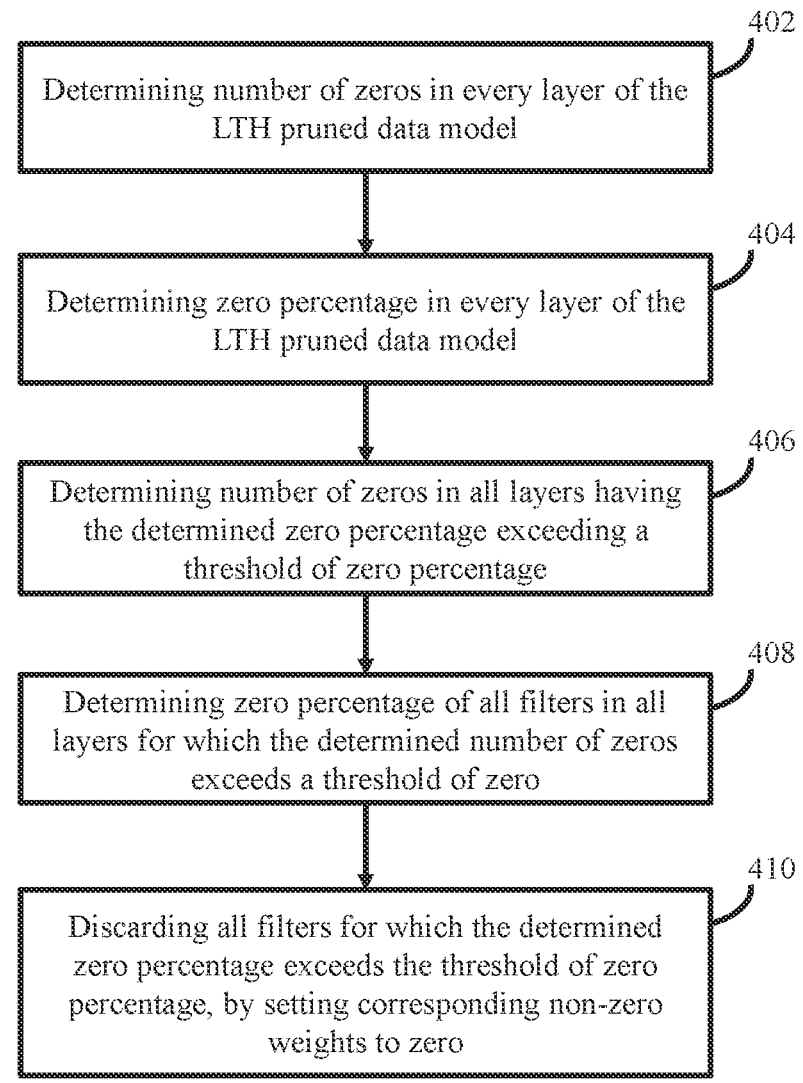
FIG. 4 is a flow diagram depicting steps involved in the process of discarding filters while generating the structured pruned data model, using the system of FIG. 1, according to some embodiments of the present disclosure.
Figure 5:
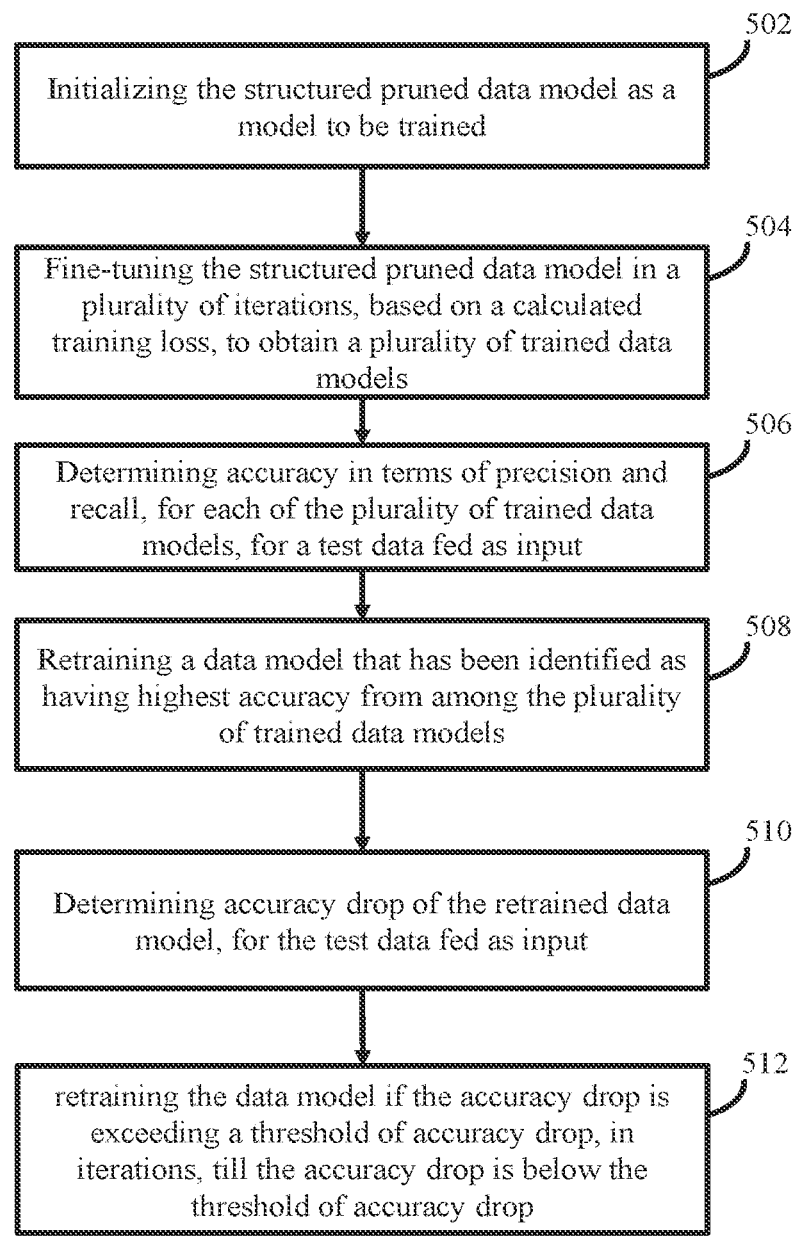
FIG. 5 is a flow diagram depicting steps involved in the process of fine-tuning the plurality of pre-trained weights and determining the accuracy drop, using the system of FIG. 1, according to some embodiments of the present disclosure.
Figure 6A:
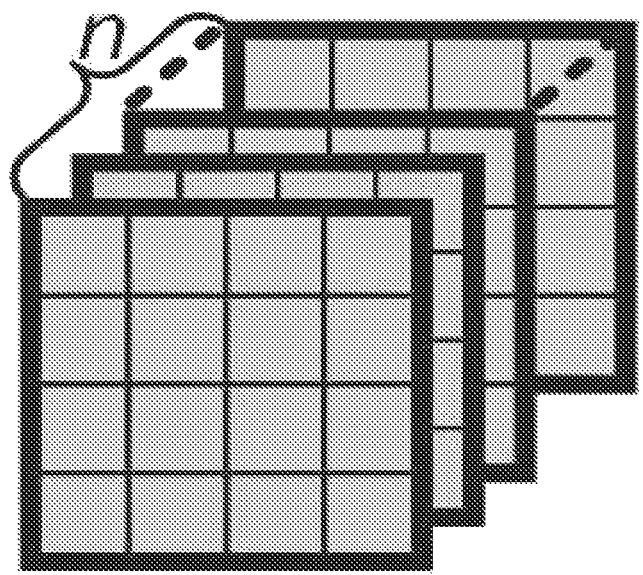
FIGS. 6A and 6B depict obtaining structured sparsity from no sparsity, while obtaining the pruned data model by the system of FIG. 1, according to some embodiments of the present disclosure.
Figure 6B:
Figure 6B:
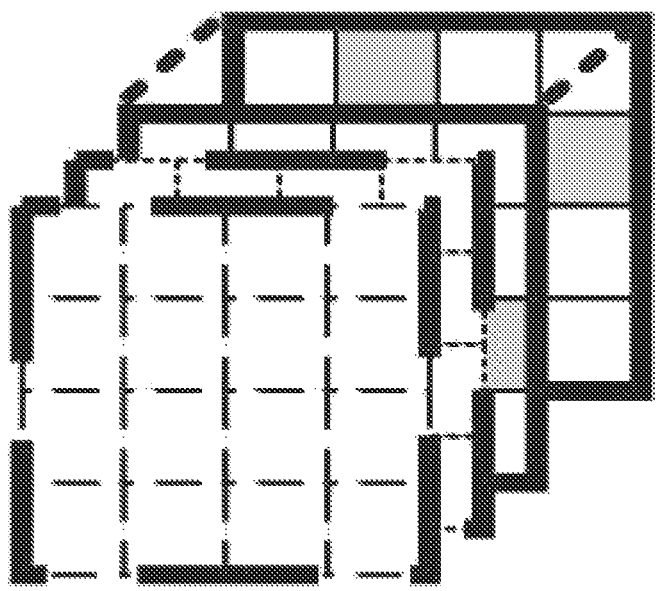

At step 402 of method 400 in FIG. 4, the system 100 determines number of zeros in every layer of the LTH pruned data model. Further, at step 404 of the method 400, the system 100 determines value of zero percentage in every layer of the LTH pruned data model. The term "zero percentage" refers to percentage of zero values in each layer, and is determined as:

$$\text{zero percentage} = \frac{\text{number of zeros in a layer}}{\text{number of weights in a layer}} * 100 \qquad (1)$$

Further, at step 406 of the method 400, the system 100 determines number of zeros in all layers having the determined zero percentage exceeding a threshold of zero percentage. Further, at step 408 of the method 400, the system 100 determines zero percentage of all filters in all the layers for which the determined number of zeros exceeds a threshold of zeros. Further, at step 410 of the method 400, the system 100 discards all filters for which the determined zero percentage exceeds the threshold of zero percentage, wherein the filters are discarded by setting corresponding non-zero weights to zero. For the filters discarded, the system 100 set gradient as zero, so that the zeroed weights set while discarding the filters remain as zero even after further training. In an embodiment, value of the threshold of zeros is decided after checking the zero percentage of every layer and by choosing the threshold of zeros as minimum zero percentage among all the layers.

Figure 3:
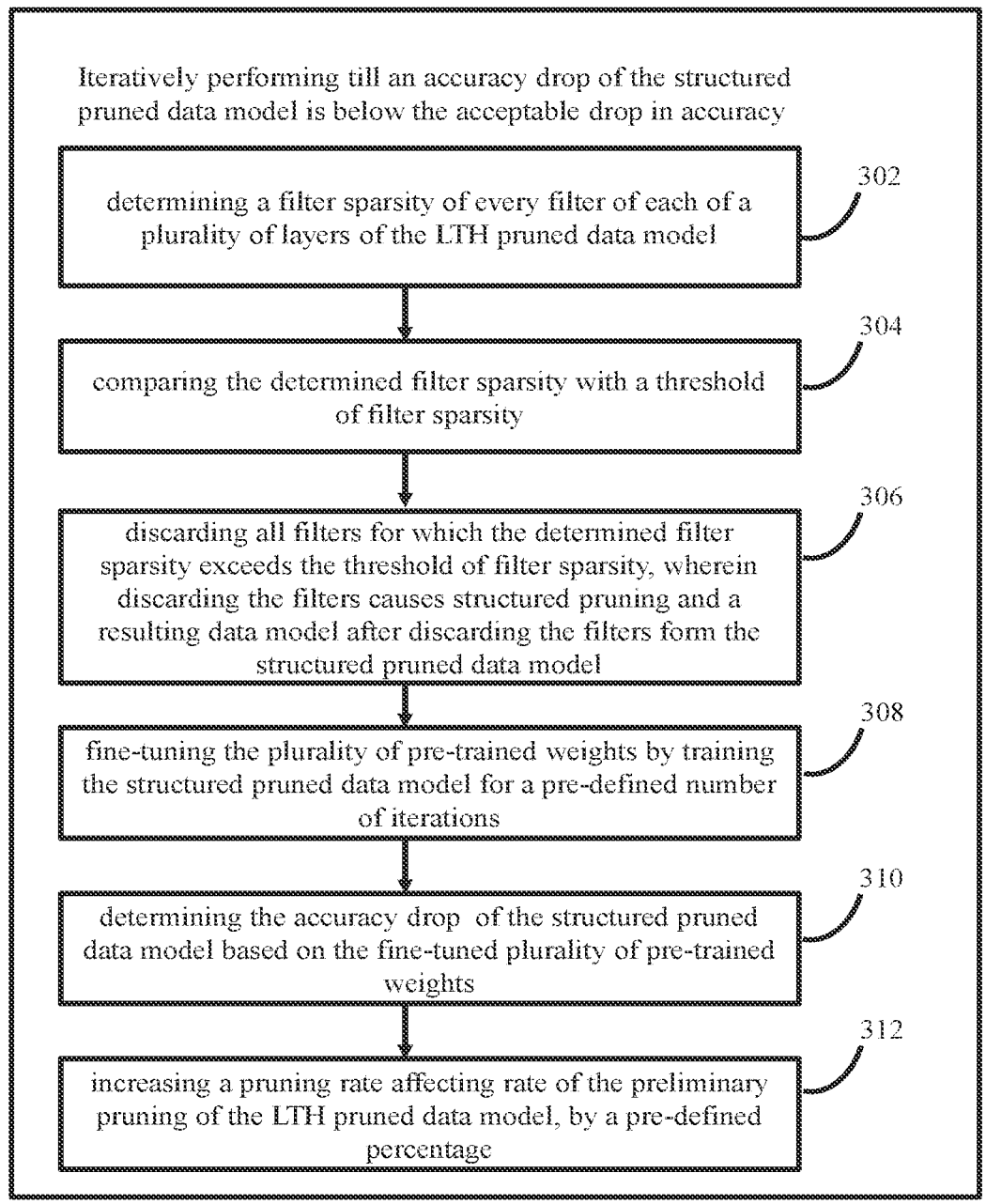
FIG. 3 is a flow diagram depicting steps involved in the process of obtaining a structured pruned data model from a LTH pruned data model, using the system of FIG. 1, according to some embodiments of the present disclosure.

Referring back FIG. 3, at step 308 of the method 300, the system 100 fine-tunes the plurality of pre-trained weights which are obtained as input, by training the structured pruned data model for a pre-defined number of iterations. The pre-defined value of the number of iterations may be changed/adjusted as per requirements. Various steps involved in the process of fine-tuning the plurality of pre-trained weights are depicted in method 500 in FIG. 5, and are explained hereafter.

At step 502 of the method 500, the system 100 initializes the structured pruned data model as a model to be trained. While initializing, the system 100 may use the plurality of pre-trained weights. Further, at step 504 of the method 500, the system 100 fine-tunes the structured pruned data model in a plurality of iterations, based on a calculated training loss, to obtain a plurality of trained data models.

To calculate the training loss, the system 100 evaluates a model_epoch model and the baseline model to generate results. The system 100 further determines Mean Square Error (MSE) loss between the model_epoch model results and baseline model results. This is referred to as MSEloss_results. The MSEloss_results is then compared pixel-wise with the baseline results as:

positive_pixel=len(MSEloss_results[$i$][(baseline_results[$i$]>=0.1)])

and positive_pixel is recorded.

Further, the system 100 determines value of sum_loss through positive loss (denoted as "posi_loss") and negative loss (denoted as "nega_loss")

if positive_pixel !=0:
for all pixel in the test_image:

posi_loss[$i$]=torch.mean(MSEloss_results[$i$][(baseline_results[$i$]>=0.1)])

if len(MSEloss_results[$i$][(baseline_results[$i$]<0.1)]) <3*positive_pixel:

For all pixels in the test_image:

nega_loss[$i$]=torch.mean(MSEloss_results[$i$][(baseline_results[$i$]<0.1)])<0.1)])

if len(MSEloss_results[$i$][(baseline_results[$i$]<0.1)]) 3*positive_pixel:

nega_loss=torch.mean(torch.topk(MSEloss_results[$i$][(baseline_results[$i$]<0.1)],3*positive_pixel)[0])

sum_loss=summation of (posi_loss[$i$]+nega_loss[$i$]) over all pixels in the test image.

if positive_pixel==0:
for all pixels in the test_image:

nega_loss[$i$]=torch.mean(torch.topk(MSEloss_results[$i$],500)[0])

Step j: sum_loss=summation of (nega_loss[i]) over all pixels in test image. sum_loss is the final total loss used in backward propagation during training i.e. training loss.

Referring back to FIG. 5, at step 506 of the method 500, the system 100 determines accuracy in terms of precision and recall, for each of the plurality of trained models, for a test data fed as input. Precision is the fraction of relevant instances among the retrieved instances, while recall is the fraction of relevant instances that were retrieved, and are calculated as:

Precision=$tp/(tp+fp)$

Recall=$tp/(tp+fn)$

Where,
true positive (TP):—A test result that correctly indicates the presence of a condition or characteristic
true negative (TN):—A test result that correctly indicates the absence of a condition or characteristic
false positive (FP):—A test result which wrongly indicates that a particular condition or attribute is present
false negative (FN):—A test result which wrongly indicates that a particular condition or attribute is absent Further, at step 508 of the method 500, the system 100 retrains a data model that has been identified as having highest accuracy from among the plurality of trained models, to obtain a retrained data model. Further, at step 510 of the method 500, the system 100 determines accuracy drop of the retrained data model, for the test data fed as input, in comparison with accuracy of a previous model. Further, at step 512 of the method 500, the system 100 retrains the data model if the accuracy drop is exceeding a threshold of accuracy drop, in iterations, till the accuracy drop is below the threshold of accuracy drop.

Referring back to FIG. 3, at step 310 of the method 300, the system 100 determines the accuracy drop of the structured pruned data model based on the fine-tuned plurality of pre-trained weights. In an embodiment, the system 100 determines the accuracy drop of the structured pruned data model with reference to accuracy of a previous version of the structured pruned data model or with reference to accuracy of the baseline model. After every iteration if the accuracy drop is still exceeding the acceptable drop in accuracy, at step 312 of the method 300, the system 100 increases a pruning rate affecting rate of pruning of the LTH pruned data model by a pre-defined percentage and for a resulting structured pruned data model the aforementioned steps are performed.

Referring back to the method 200, at step 208 of the method 200, the system 100 trains the structured pruned data model (i.e. latest version for which the accuracy drop is below the acceptable drop in accuracy) is then trained using data from a teacher model in a Knowledge Distillation algorithm, wherein a resultant data model obtained after training the structured pruned data model forms the data model for text detection.

The data model for text detection when deployed for real-time applications, obtains and processes document(s) from which text detection is to be done as input, and outputs the identified text. Results obtained in such an implementation are given in the experimental data section below.

Experimental Data:

The datasets used during experiments were:

ICDAR 2015 dataset which consists of 1000 training images and 500 testing images with texts in English and RGB format with a resolution of 720×1280. The text instances are labelled at the word level and ground truth consists of quadrilateral boxes in 8-point coordinate system for every word.

ICDAR 2019 which is a Scanned Receipts OCR and Information Extraction (SROIE) dataset consists of 626 and 361 scanned receipt images for training and testing, respectively, with text bounding box annotation in 8-point coordinate form.

During the experiments, a native CRAFT model was designed as teacher and compressed CRAFT networks as student with weight initialized by xavier initialization. The training was done on Nvidia A100 GPU with a batch size of 10. The distillation loss, ADAM Optimizer and L2 regularization with a decay of 10-4 is used. Down-scaled models for 500 epochs and LTH+channel pruned network for 150 epochs were trained.

For inference, the model was put in evaluation mode and tested it on IC15 and IC19 datasets. As part of pre-processing, test images were scaled to 1280×720×3 followed by image normalization using mean and variance. The model produced output sized (h/2, w/2,2) i.e (640,360,2), region and affinity feature maps. In the post-processing step, the output was converted to heat maps and polygons created over predicted textual regions. The predicted text boxes were characterized as correctly predicted by calculating its overlap (IoU threshold=0.4) with boxes from ground truth. From the predicted and ground truth text boxes, accuracy (precision and recall) of model was estimated.

Accuracy and compression data for six downscaled and three LTH+channel pruned models are given in Table I. The student architectures were compressed by 14-5100× with accuracy drop in range 1.1%-19% for IC15 and 0.5%-16% for IC19 dataset. As expected, precision and recall for extremely compressed models (C4, C2 and C1) faced large drop (i10%) in accuracy. C32-C8 architectures retained accuracy within 5% drop but C32/C16 were only moderately compressed and consequently would not yield significant performance gains for the given accuracy drop.

Among the down-scaled architectures, C8 model exhibited high compression with 5% accuracy drop. The data model generated by the system 100 suffered lower accuracy drop despite high compression. For similar compression, the data model generated by the system 100 have higher accuracy as compared to down-scaled models. For instance, 60× compressed model, C8 has lower accuracy as compared to C18Pr model that is 80× compressed. Additionally, C6Pr offered the same accuracy as C8 model but offered higher (2.6×) compression.

Figure 7A:
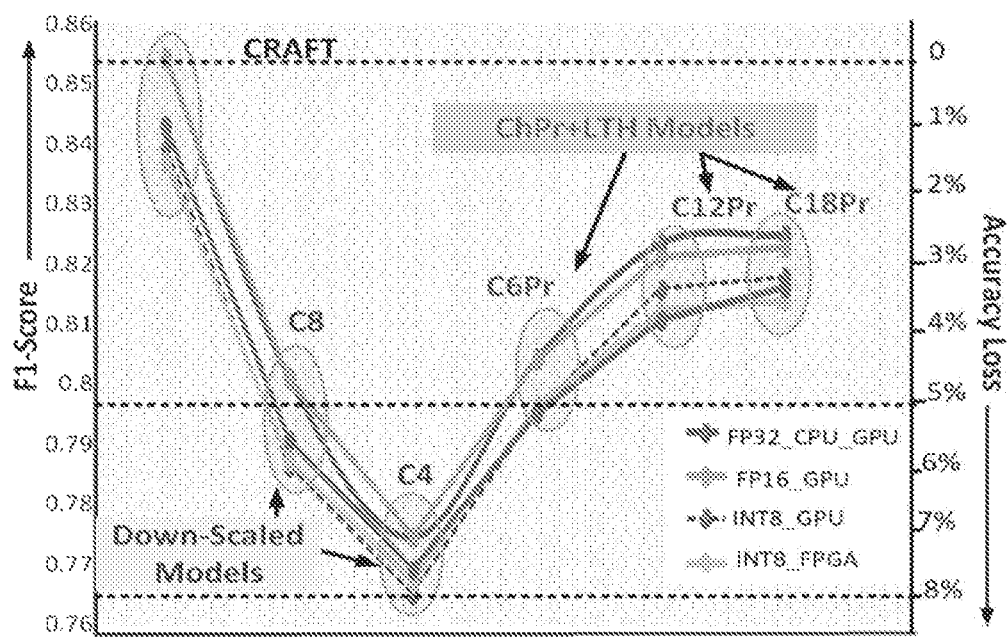
FIGS. 7A and 7B depict accuracy variation and throughput variation in an experimental setup of the system of FIG. 1, according to some embodiments of the present disclosure.

The precision of computation denotes the number of bits and datatype used in calculations. Lower precision compute offers higher computational power (in terms of GOP/S) which translated to performance improvements. For instance, V100 GPU supports FP32 and FP16 computations but the latter has 2× the computational power [43]. However, reducing the precision affects the prediction accuracy since the number of bits used in computation reduces. Effect on accuracy due to compute precision reduction was analyzed for native and compressed CRAFT models on V100 GPU, U280 FPGA DPU and Xeon CPU. Among the selected hardware platforms, all supported INT8 precision. In addition, Xeon supports FP32 and V100 supports both FP32 and FP16. The CRAFT and its compressed models were compiled for FPGA using VITISAI quantizer. TensorRT (maps computation to tensor cores) and Pytorch are used for quantizing models on GPU and CPU, respectively. F1-score was chosen as the accuracy metric to capture the essence of both Precision and Recall. It takes a value between [0,1] where higher score denotes high precision and recall. The accuracy variation with compute precision on IC15 dataset is shown in FIG. 7A. It was observed that all CRAFT models: native and compressed, suffered 1-2% accuracy loss from their respective FP32 accuracy due to reduced precision. However, with respect to native CRAFT, the accuracy loss of compressed models is up to 8%. Among the compressed models, ChPr+LTH models suffered lower accuracy loss (≤5%) than the down sampled models. This indicates that ChPr+LTH models perform better on accuracy than downsampled models after reducing precision.

Another observation is on the compilers for target hardware platforms. The VITIS AI quantizer and GPU compiler are able to compress models from FP32 to INT8 with an accuracy drop of 0.3-1.7%. In case of VITIS AI quantizer, a calibration step is carried out that uses a small portion of test data to manipulate the quantized weights so that the accuracy drop can be minimized. Additionally, the results suggest that smaller models (C6Pr, C4) suffer lower accuracy loss with precision variation. This can be attributed to the lesser parameters and computational load of small models.

Figure 7B:
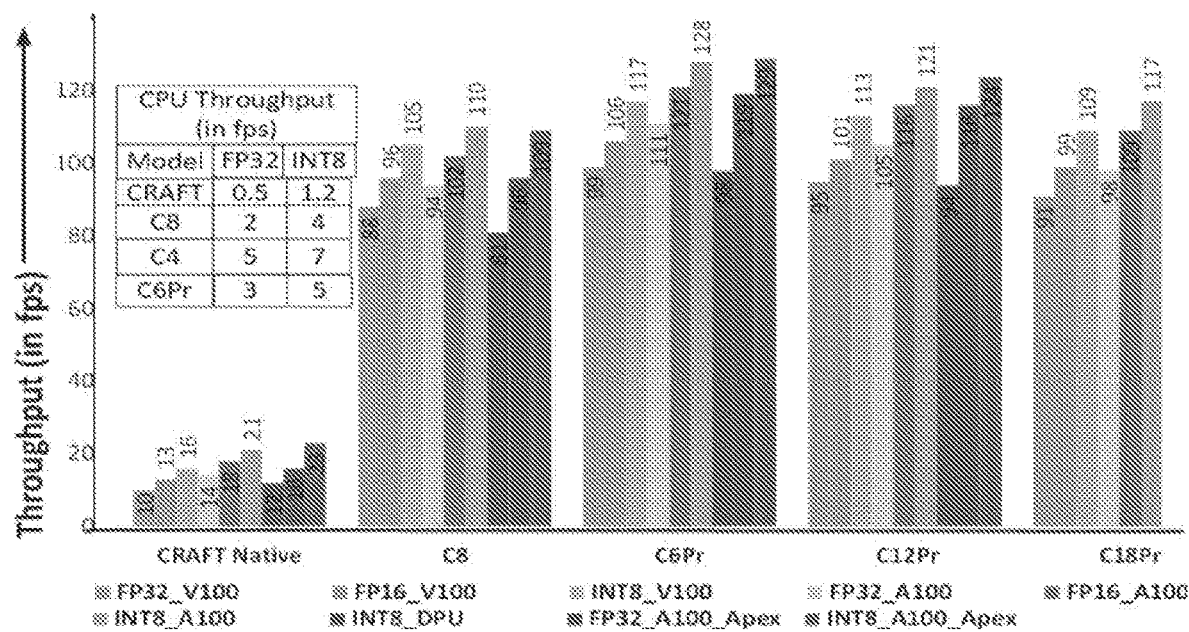
Figure 7C:
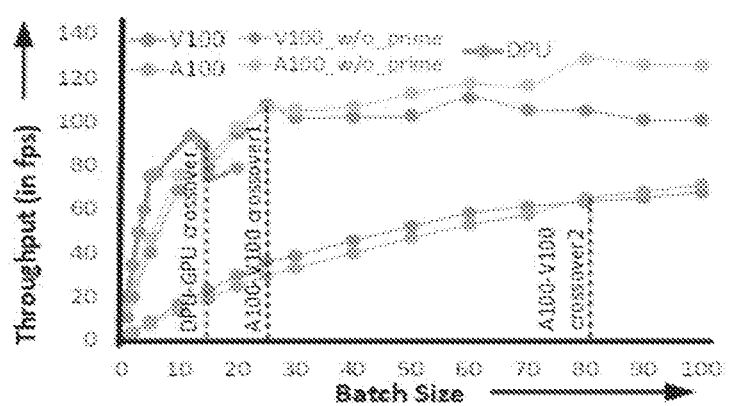
FIG. 7C depicts throughput variation with batch size in an experimental setup, according to some embodiments of the present disclosure.

The native and compressed CRAFT models were tested for inference time on GPU (A100, V100), FPGA (U280 DPU) and Xeon CPU. The performance of CRAFT model was tested for all supported precisions on target hardware platforms. In addition to TensorRT, Apex library is used to compile models for A100. The Apex library introduces 2:4 sparsity into models. 2:4 sparse models were supported on A100 GPU owing to its special hardware. The maximum throughput achieved by CRAFT models was on A100 GPU with INT8 precision in Apex and TensorRT compile (see Table IV). The native CRAFT model achieved the highest throughput of 23 fps on A100 with INT8 precision and Apex compilation. This is 2 fps higher than compilation on TensorRT for same hardware and precision. However, the benchmark presented A100 documentation suggested the speedup with Apex to be 1.5× as compared to other compilation. From a detailed layer-wise analysis, it was observed that the Apex speed-up is limited to convolution layers and other layers like batch normalization, maxpool etc. are not accelerated. In the CRAFT model, the batch normalization is the bottleneck layer and even though convolution layers are accelerated, apex compilation did not yield considerable speed-up over TensorRT. The throughput achieved on all target hardware is shown in FIG. 7B for their respective best batch size. The best batch size for A100, V100 and FPGA DPU are 65, 80 and 12, respectively. The CPU throughput ranges between 0.5-5 fps. The INT8 C6Pr model gets 10× speed-up w.r.t. FP32 implementation of native CRAFT. Additionally, C8 and C4 models showed 4-14× significant performance improvement on CPU. The compressed models offered 5-8× speed-up over native CRAFT and GPU implementations providing highest throughput. The FPGA DPU offers throughput between 88-98 fps. However, this observation alone did not rule out the usability of FPGA DPUs as preferable neural processors.

From the performance perspective, INT8 implementation performed better than FP32 because the computational power of hardware is higher at lower precision. However, while selecting the hardware platform and precision for a particular model, the effect on accuracy should also be considered.

1) Effect of Batch-size on throughput: For throughput measurement experiments, average time to run n calls to a batch of b images was measured. It was observed that it took large time to run the first batch whereas the subsequent batches were able to finish in three order lesser time. This behaviour was seen dominantly in GPUs for all CRAFT variants. The large time (in order of sec) taken during first run is spent in transferring the model parameters, loading library engines (TensorRT, Pytorch, Apex etc.) and prepare the GPU for upcoming workload. This was defined as a priming time. The throughput data did not include GPU priming time. However, in a real-deployment scenario priming time cannot be neglected especially since it ranges in few seconds. Variation of throughput with batch size for C6Pr INT8 model on IC15 dataset in FIG. 7C. It was observed that DPU have higher throughput as compared to GPUs for batch size up to 12 images (indicated as DPUGPU crossover). For batch size up to 20 (indicated as A100-V100 crossover)) images, A100 and V100 had similar throughput beyond which A100 offers higher throughput than V100. The two GPUs performed similar for batch size up to 80 (indicated as A100-V100 crossover2) if priming time is accounted for in throughput. For large batch sizes, the priming time gets amortized over large number of images and consequently the throughput improves consistently. This observation indicated that hardware platform with best throughput changes with batch size, which further depends on the workload and nature of application.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of document processing and text detection using low memory footprint and non-process intensive approach. The embodiment, thus provides a method and system for generating a data model for text identification from documents. Moreover, the embodiments herein further provides a mechanism of pruning a baseline data model which involves discarding filters that have sparsity exceeding a threshold of sparsity.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of obtaining a data model for text detection, comprising:
obtaining, via one or more hardware processors, a) a training dataset, b) a test dataset, c) a pre-trained base model, d) a plurality of pre-trained weights, and e) an acceptable drop in accuracy with respect to the baseline model, as input;

pruning, via the one or more hardware processors, the pre-trained base model using a Lottery Ticket Hypothesis (LTH) algorithm to generate a LTH pruned data model;

trimming, via the one or more hardware processors, the LTH pruned data model to obtain a structured pruned data model, comprising iteratively performing till an accuracy drop of the structured pruned data model is below the acceptable drop in accuracy:

determining a filter sparsity of every filter of each of a plurality of layers of the LTH pruned data model;

comparing the determined filter sparsity with a threshold of filter sparsity;

discarding all filters for which the determined filter sparsity exceeds the threshold of filter sparsity, wherein discarding the filters causes structured pruning and a resulting data model after discarding the filters form the structured pruned data model;

fine-tuning the plurality of pre-trained weights by training the structured pruned data model for a pre-defined number of iterations;

determining the accuracy drop of the structured pruned data model based on the fine-tuned plurality of pre-trained weights; and increasing a pruning rate affecting rate of the preliminary pruning of the LTH pruned data model, by a pre-defined percentage; and training, via the one or more hardware processors, the structured pruned data model from a teacher model in a Knowledge Distillation algorithm, wherein a resultant data model obtained after training the structured pruned data model forms the data model for text detection.

2. The method of claim 1, wherein discarding the filters comprises:

determining number of zeros in every layer of the LTH pruned data model;

determining zero percentage in every layer of the LTH pruned data model;

determining number of zeros in all layers having the determined zero percentage exceeding a threshold of zero percentage;

determining zero percentage of all filters in all the layers for which the determined number of zeros exceeds a threshold of zeros; and discarding all filters for which the determined zero percentage exceeds the threshold of zero percentage, wherein the filters are discarded by setting corresponding non-zero weights to zero.

3. The method of claim 1, wherein fine-tuning the plurality of pre-trained weights and determining the accuracy drop comprises;

initializing the structured pruned data model as a model to be trained;

fine-tuning the structured pruned data model in a plurality of iterations, based on a calculated training loss, to obtain a plurality of trained data models;

determining accuracy in terms of precision and recall, for each of the plurality of trained models, for a test data fed as input;

retraining a data model that has been identified as having highest accuracy from among the plurality of trained models;

determining accuracy drop of the retrained data model, for the test data fed as input; and retraining the data model if the accuracy drop is exceeding a threshold of accuracy drop, in iterations, fill the accuracy drop is below the threshold of accuracy drop.

4. A system for obtaining a data model for text detection, comprising:

one or more hardware processors;

a communication interface; and a memory storing a plurality of instructions, wherein the plurality of instructions when executed, cause the one or more hardware processors to:

obtain a) a training dataset, b) a test dataset, c) a pre-trained base model, d) a plurality of pre-trained weights, and e) an acceptable drop in accuracy with respect to the baseline model, as input;

prune the pre-trained base model using a Lottery Ticket Hypothesis (LTH) algorithm to generate a LTH pruned data model;

trim the LTH pruned data model to obtain a structured pruned data model, comprising iteratively performing till an accuracy drop of the structured pruned data model is below the acceptable drop in accuracy:

determining a filter sparsity of every filter of each of a plurality of layers of the LTH pruned data model;

comparing the determined filter sparsity with a threshold of filter sparsity;

discarding all filters for which the determined filter sparsity exceeds the threshold of filter sparsity, wherein discarding the filters causes structured pruning and a resulting data model after discarding the filters forms the structured pruned data model; fine-tuning the plurality of pre-trained weights by training the structured pruned data model for a pre-defined number of iterations;

determining the accuracy drop of the structured pruned data model based on the fine-tuned plurality of pre-trained weights; and increasing a pruning rate affecting rate of the preliminary pruning of the LTH pruned data model, by a pre-defined percentage; and train the structured pruned data model from a teacher model in a Knowledge Distillation algorithm, wherein a resultant data model obtained after training the structured pruned data model forms the data model for text detection.

5. The system as claimed in claim 4, wherein the one or more hardware processors are configured to discard the filters by:

determining number of zeros in every layer of the structured pruned data model;

determining zero percentage in every layer of the structured pruned data model;

determining number of zeros in all layers having the determined zero percentage exceeding a threshold of zero percentage;

determining zero percentage of all filters in all the layers for which the determined number of zeros exceeds a threshold of zeros; and discarding all filters for which the determined zero percentage exceeds the threshold of zero percentage, wherein the filters are discarded by setting corresponding non-zero weights to zero.

6. The system as claimed in claim 4, wherein the one or more hardware processors are configured to fine-tune the plurality of pre-trained weights and determining the accuracy drop by:

initializing the structured pruned data model as a model to be trained;

fine-tuning the structured pruned data model in a plurality of iterations, based on a calculated training loss, to obtain a plurality of trained data models;

determining accuracy in terms of precision and recall, for each of the plurality of trained models, for a test data fed as input;

retraining a data model that has been identified as having highest accuracy from among the plurality of trained models;

determining accuracy drop of the retrained data model, for the test data fed as input; and retraining the data model if the accuracy drop is exceeding a threshold of accuracy drop, in iterations, till the accuracy drop is below the threshold of accuracy drop.

7. One or more non-transitory machine-readable information storage mediums comprising one or more instructions which when executed by one or more hardware processors cause:

obtaining a) a training dataset, b) a test dataset, c) a pre-trained base model, d) a plurality of pre-trained weights, and e) an acceptable drop in accuracy with respect to the baseline model, as input;

pruning the pre-trained base model using a Lottery Ticket Hypothesis (LTH) algorithm to generate a LTH pruned data model;

trimming the LTH pruned data model to obtain a structured pruned data model, comprising iteratively performing till an accuracy drop of the structured pruned data model is below the acceptable drop in accuracy:

determining a filter sparsity of every filter of each of a plurality of layers of the LTH pruned data model;

comparing the determined filter sparsity with a threshold of filter sparsity;

discarding all filters for which the determined filter sparsity exceeds the threshold of filter sparsity, wherein discarding the filters causes structured pruning and a resulting data model after discarding the filters form the structured pruned data model;

fine-tuning the plurality of pre-trained weights by training the structured pruned data model for a pre-defined number of iterations;

determining the accuracy drop of the structured pruned data model based on the fine-tuned plurality of pre-trained weights; and increasing a pruning rate affecting rate of the preliminary pruning of the LTH pruned data model, by a pre-defined percentage; and training the structured pruned data model from a teacher model in a Knowledge Distillation algorithm, wherein a resultant data model obtained after training the structured pruned data model forms the data model for text detection.

8. The one or more non-transitory machine-readable information storage mediums of claim 7, wherein discarding the filters comprises:

determining number of zeros in every layer of the LTH pruned data model;

determining zero percentage in every layer of the LTH pruned data model;

determining number of zeros in all layers having the determined zero percentage exceeding a threshold of zero percentage;

determining zero percentage of all filters in all the layers for which the determined number of zeros exceeds a threshold of zeros; and discarding all filters for which the determined zero percentage exceeds the threshold of zero percentage, wherein the filters are discarded by setting corresponding nonzero weights to zero.

9. The one or more non-transitory machine-readable information storage mediums of claim 7, wherein fine-tuning the plurality of pre-trained weights and determining the accuracy drop comprises:

initializing the structured pruned data model as a model to be trained;

fine-tuning the structured pruned data model in a plurality of iterations, based on a calculated training loss, to obtain a plurality of trained data models;

determining accuracy in terms of precision and recall, for each of the plurality of trained models, for a test data fed as input;

retraining a data model that has been identified as having highest accuracy from among the plurality of trained models;

determining accuracy drop of the retrained data model, for the test data fed as input; and retraining the data model if the accuracy drop is exceeding a threshold of accuracy drop, in iterations, till the accuracy drop is below the threshold of accuracy drop.

* * * * *